(12) United States Patent
Tampieri

(10) Patent No.: US 6,262,742 B1
(45) Date of Patent: Jul. 17, 2001

(54) GENERATING IMAGE DATA

(75) Inventor: Filippo Tampieri, Montreal (CA)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/261,144

(22) Filed: Mar. 3, 1999

(51) Int. Cl.$^7$ .................................................. G06T 15/00
(52) U.S. Cl. .............................................................. 345/426
(58) Field of Search ..................................... 345/419, 423, 345/425, 426, 427, 436, 437, 438

(56) References Cited

U.S. PATENT DOCUMENTS

| | | | |
|---|---|---|---|
| 5,175,808 | * 12/1992 | Sayre ..................................... | 395/133 |
| 5,488,700 | * 1/1996 | Glassner ................................ | 395/126 |
| 5,914,721 | * 6/1999 | Lim ........................................ | 345/421 |
| 5,936,633 | * 8/1999 | Aono et al. ............................ | 345/432 |
| 6,078,332 | * 6/2000 | Ohazama ............................... | 345/426 |

OTHER PUBLICATIONS

"Interactive Design of Complex Time–Dependent Lighting" J. Dorsey et al., Cornell University, IEEE Computer Graphics and Applications, vol. 15, Issue 2, Mar. 1995.*

"Implementation and Analysis of an Image–Base Global Illumination Framework for Animated Environments" J. Nimeroff et al., IEEE Transactions on Visualization and Computer Graphics, vol. 2, No. 4, Dec. 1996.*

"Discontinuity Meshing for Accurate Radiosity" Dani Lischinski et al., Cornell University, IEEE Computer Graphics & Applications, Nov. 1992.*

"Radiosity Redistribution for Dynamic Environments" D. W. George et al., Cornell University, IEEE Computer Graphics & Applications, 1990.*

"Fast Approximate Quantitative Visibility for Complex Scenes" Yiorgos Chrysanthou, IEEE, Computer Graphics International Proceedings, 1998.*

"An Efficient Implementation Of Affine Transformation Using One–Dimensional FFT's" E. Pang et al., University of Toronto, Ontario, MtS–3G4, Canada, IEEE Conference on, vol. 4, pp. 2885–2888, 1997.*

* cited by examiner

Primary Examiner—Mark Zimmerman
Assistant Examiner—Enrique L Santiago
(74) Attorney, Agent, or Firm—Gates & Cooper LLP

(57) ABSTRACT

Image data is generated from scene data, in which the scene data include object elements in world space. Each object element has a surface that may be subdivided into a mesh and a plurality of these objects have a surface that is created in response to data from a master shape in canonical space. The surface is created by an affine transformation of the master shape and the master shape has a known area. A corresponding area of the transformed surface is calculated with reference to the adjoint matrix and the affine transformation. With this information, the surface areas in world space are used to determine light emission characteristics for the scene. The technique is particularly attractive when rendering images in real-time for application within a virtual set.

40 Claims, 20 Drawing Sheets

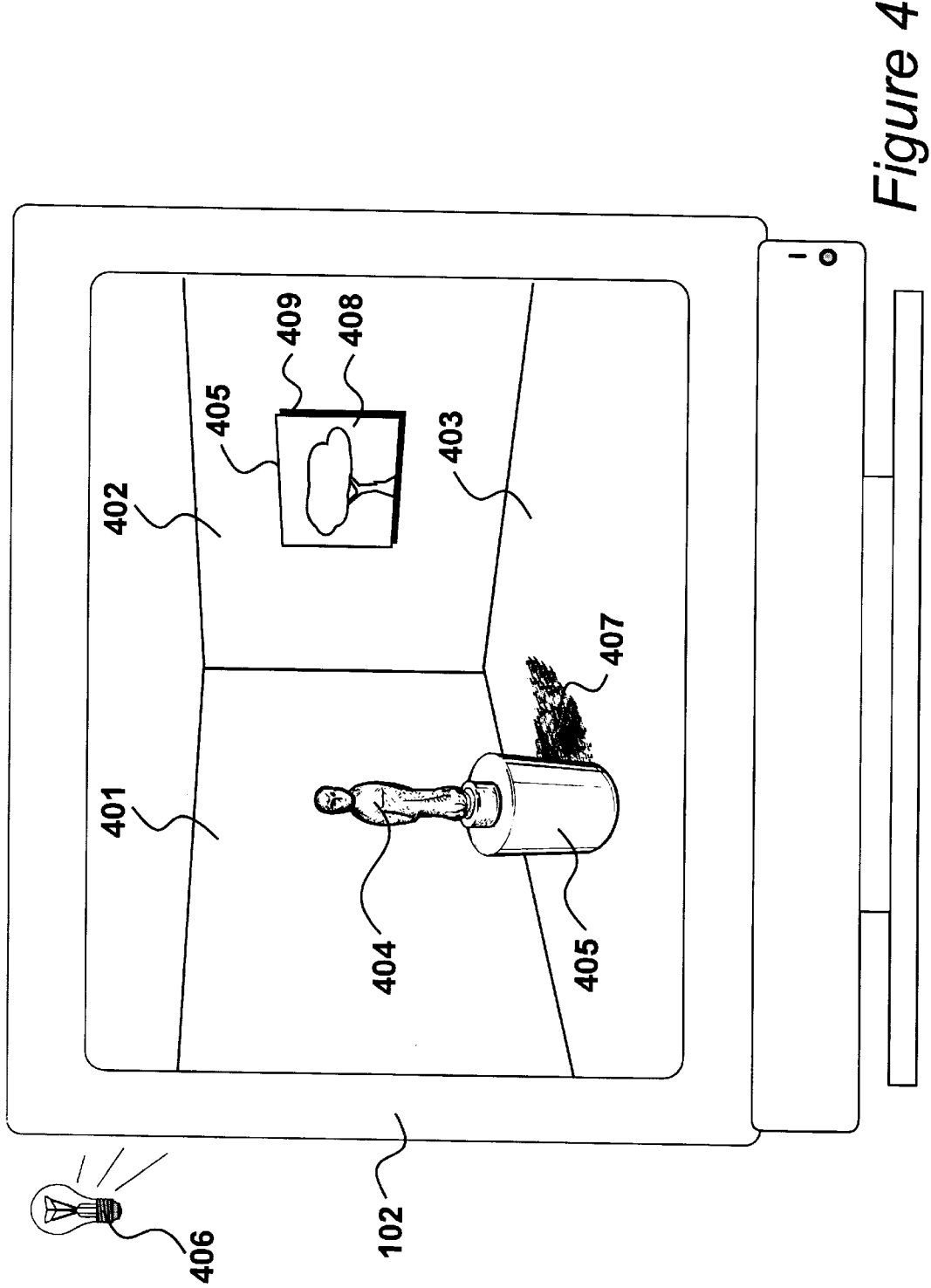

*Figure 5B*  $\quad B_i A_i = E_i A_i + R_i \sum_{j=1}^{n} B_j A_j \cdot F_{ji}$

*Figure 5C*  $\quad F_{ij} \cdot A_i = F_{ji} \cdot A_j$

*Figure 5D*  $\quad B_i = E_i + R_i \sum_{j=1}^{n} B_j F_{ij}$

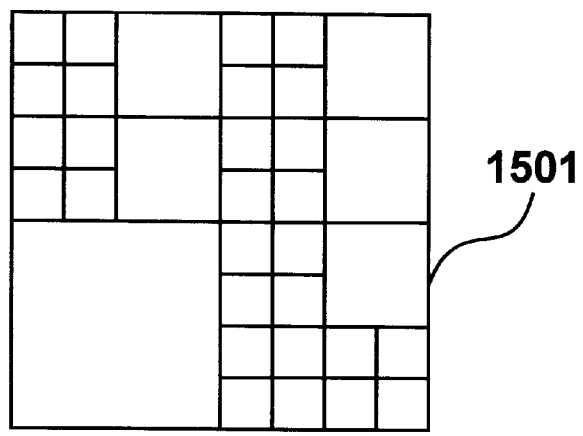
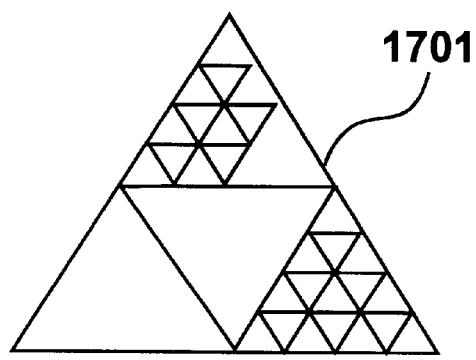
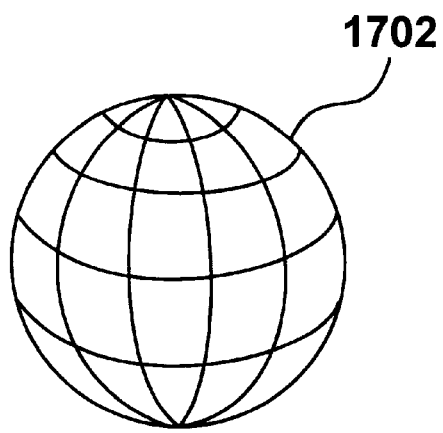
*Figure 17*

1801 — Canonical Space / World Space

1802  $A = \int f(A) \cdot dA$

1803  $F(A) = \dfrac{dA'}{dA}$

1804  $dA' = (M \cdot du) \times (M \cdot dv)$

1805  $dA' = |M^* \cdot n|$
Where $M^* =$ Adjoint of M
And $n = du \times dv$

1806  $f(A) = \dfrac{|M^* \cdot n|}{|n|}$

1807  $A = |M^* \cdot n|$

GENERATING IMAGE DATA

FIELD OF THE INVENTION

The present invention relates to generating image data, wherein a plurality of elements are defined in three-dimensional space.

BACKGROUND TO THE INVENTION

Several procedures are known for rendering images containing elements defined as three dimensional data. A known approach to generating images of photo-realistic quality is to consider reflections between all elements simultaneously. The light emission of any given element is considered as being dependent upon the sum of contributions from all other elements and a set of equations is established that represents these interactions. The light emission values for all the elements are then determined simultaneously by solving a system of equations.

This procedure is known as radiosity simulation. The system of equations is usually extremely large, and several refinements to radiosity simulation have been established in order to make implementation of this method practical for scenes containing large numbers of elements.

A known advantage of radiosity is that once the system of equations has been solved, and light emission values determined, the light emission of elements may be considered as view-independent, resulting in a separate radiosity rendering process which is capable of rendering a view from any position. The high efficiency of radiosity rendering makes radiosity particularly suitable for demanding applications, such as generating long sequences of image data frames for film or video, or generating image data in real time.

In the process of radiosity simulation, large data structures are generated which efficiently represent all of the interactions that are necessary in order to obtain light emission values for all of the elements in a scene. In photo-realistic implementation of radiosity simulation, a hierarchical structure of elements is created, such that complex lighting gradients over the surface of various objects may be represented to a high degree of resolution. This necessitates the definition of large numbers of small mesh elements, of which object surfaces are comprised. In order to reduce the amount of memory that is used to represent the resulting system of equations, mesh elements having similar geometry may be associated with a common master element, by way of a transformation function. The use of master elements in hierarchical scene structures has been established for reducing memory requirements within photo-realistic image rendering algorithms such as ray tracing.

Master elements are considered as residing in canonical space, whereas the objects and mesh elements of a three-dimensional scene are considered as residing in world space. The set of transformation functions between master elements in canonical space and elements in world space that is required for ray tracing is known. However, radiosity simulation requires additional functionality to be available, in order to take full advantage of the data structures that are created when mapping mesh elements in world space to master elements.

It is an aim of the present invention to provide an improved method of master element mapping for use in radiosity simulation.

SUMMARY OF THE INVENTION

According to a first aspect of the present invention, there is provided a method of generating image data from scene data, wherein said scene data includes object elements in world space; wherein said object elements each have a surface that may be subdivided into a mesh; a plurality of said objects have a surface that is created in response to data from a master shape in canonical space; said surface is created by an affine transformation of said master shape; said master shape has a known area; a corresponding area of said surface is calculated with reference to the adjoint matrix of said affine transformation; and said surface areas in world space are used to determine light emission characteristics for said scene.

In a preferred embodiment, the affine transformation is applied to mesh elements in the master shape to generate mesh elements in world space, wherein the adjoint matrix of said affine transformation is determined once for a selected surface; and said adjoint matrix is applied a plurality of times to determine the areas of mesh elements of said selected surface. Preferably, the master shape is meshed hierarchically such that said surfaces derived from said master shape derive their respective mesh elements from said master shape.

In a preferred embodiment, the master shape is planar and said surface area may be calculated by a matrix-vector multiplication between adjoint matrix and a normal to said master shape, obtaining a magnitude, and multiplying this magnitude by the corresponding area in the master shape.

Preferably, the master shape is non-planar and an area function is determined with reference to a ratio between a differential area of said surface in world space and a corresponding differential area to said master shape in canonical space, said differential area in world space being determined with reference to said adjoint matrix and a normal; and a numerical quadrature integration is performed with reference to said area function in order to determine the area of said surface in world space.

Preferably, an area of said surface in world space is determined by the product of a corresponding area in the master shape in canonical space, and the magnitude of the matrix-vector multiplication between said adjoint matrix and a normal to said area of said master shape, wherein said normal has unit magnitude.

According to a second aspect of the present invention, there is provided an apparatus for generating image data from scene data, including processing means, and storage means for storing instructions for said processing means and data representing said scene; wherein said scene includes object elements in world space; said object elements each having a surface that may be subdivided into a mesh, and a plurality of said objects having a surface that is created in response to data from a master shape in canonical space; said instructions configurable to control said processing means to perform the steps of: creating said surface by an affine transformation of said master shape, wherein said master shape has a known area; calculating a corresponding area of said surface with reference to the adjoint of said affine transformation; and using said surface in world space to determine light emission characteristics for this scene.

BRIEF DESCRIPTION OF THE DRAWINGS

FIG. 4 details an image displayed on the monitor shown in FIG. 1, including several scene objects, that include two walls and a picture;

FIG. 5B summarises light energy transfer between a single receiving surface, and an arbitrary number of emitting surfaces;

FIG. 5C shows the radiosity reciprocity equation;

FIG. 5D shows the classical radiosity equation;

FIG. 17 illustrates master elements of the types identified in FIGS. 15 and 16;

DETAILED DESCRIPTION OF THE PREFERRED EMBODIMENTS

Figure 1:
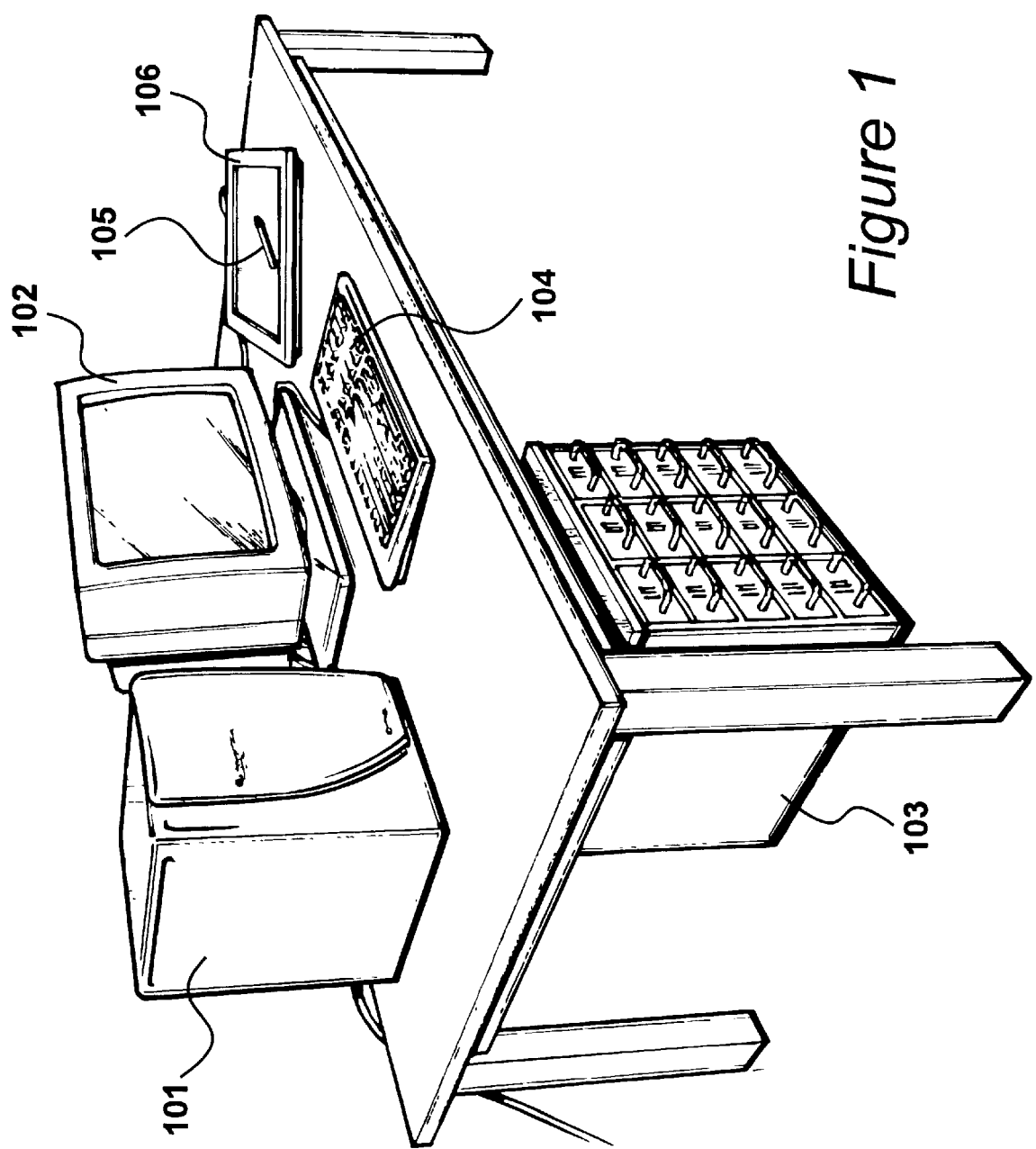
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Thereafter, this information is made available for particular viewing positions during radiosity rendering. The rendering process requires a sufficiently low level of computation to enable image frames of high definition and high photo realism to be rendered with high efficiency.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
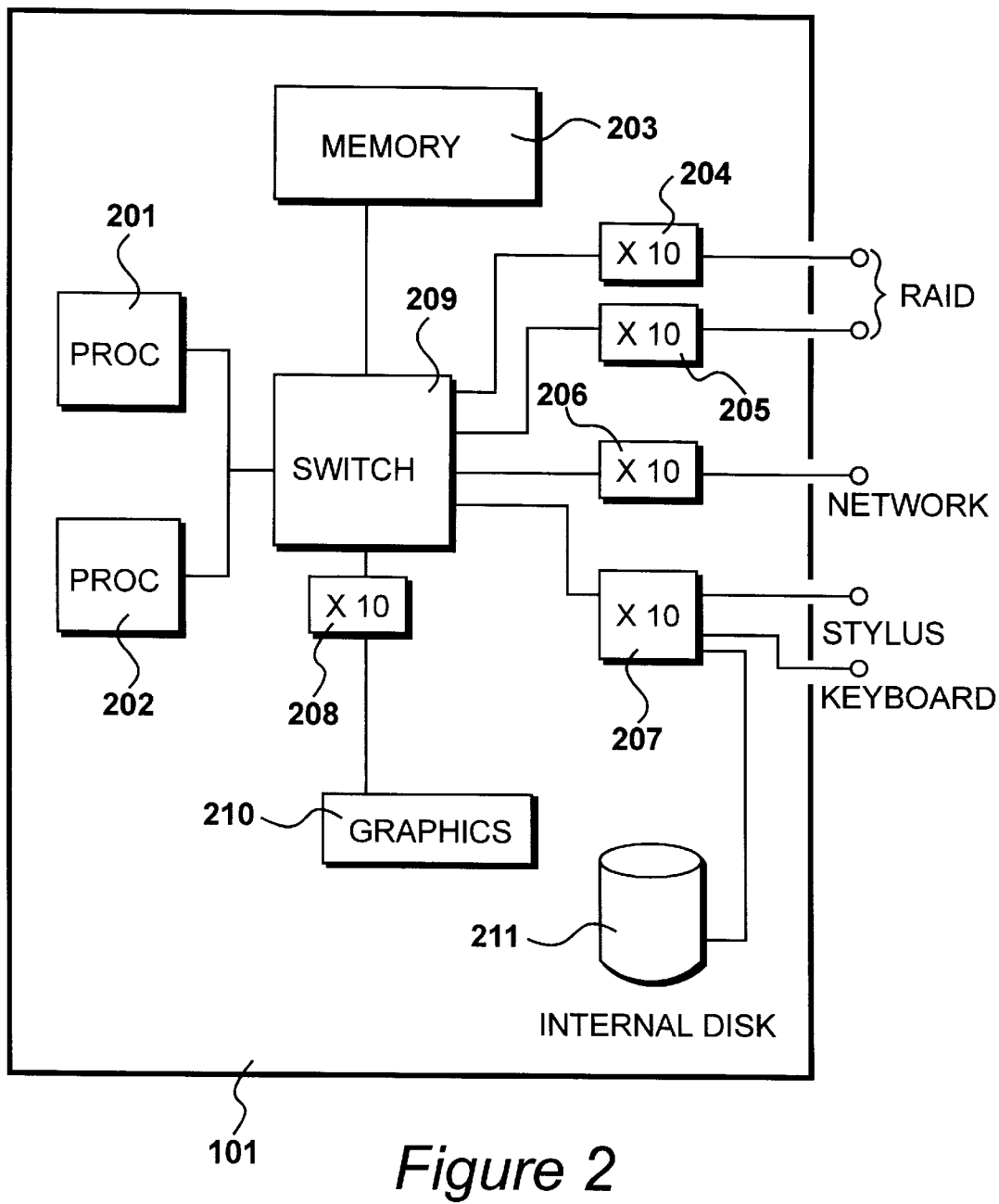
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 and with a memory 203 and other peripherals. The memory 203 includes typically two hundred and fifty-six megabytes of dynamic RAM. The memory is used to store instructions for the processors, and data, including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronisation between the peripheral circuits and the extremely high speed data paths of the main processor structure.

A first XIO interface circuit 204 provides bi-directional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 211, four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
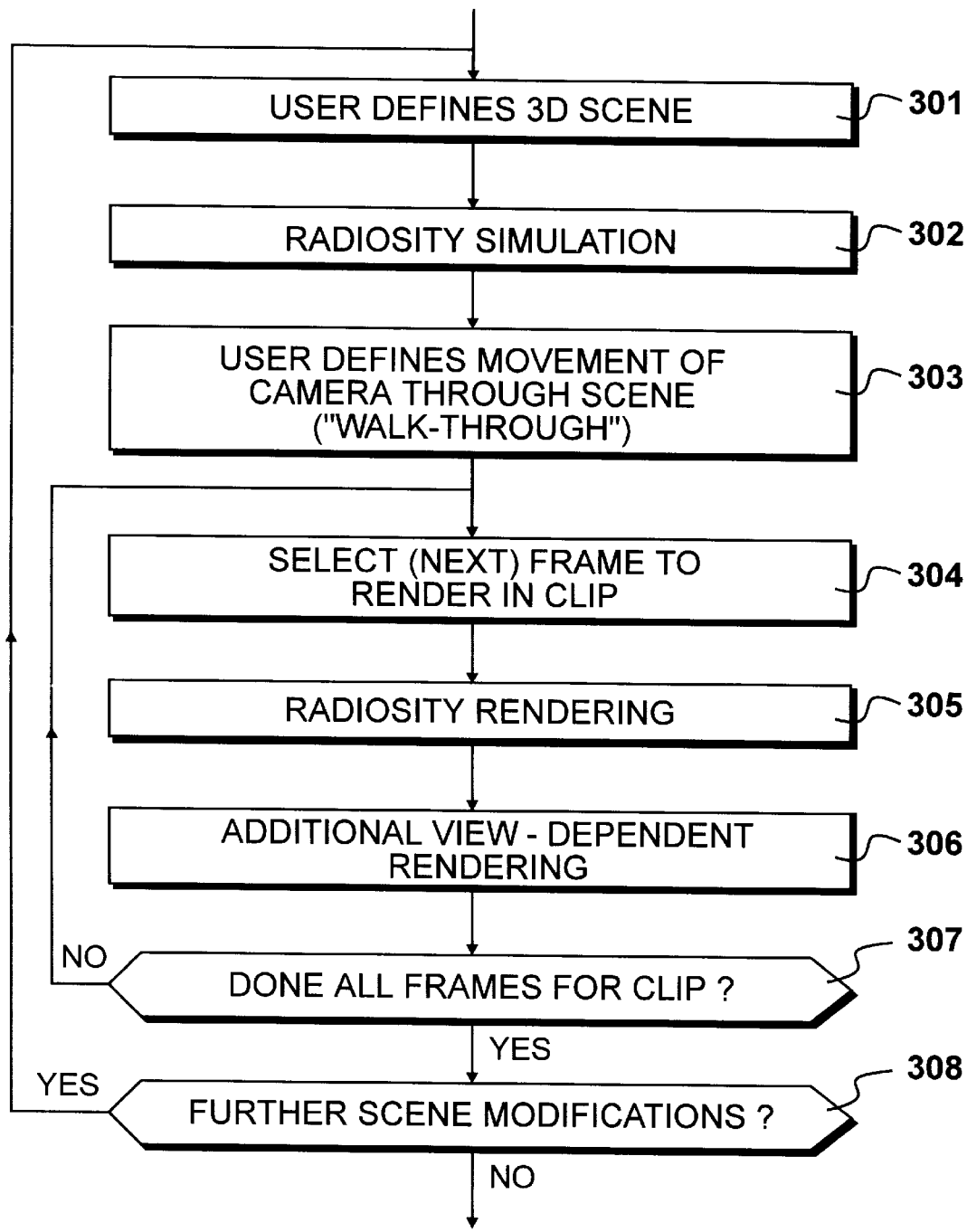
FIG. 3 details processes performed by the processing system shown in FIG. 1 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyse objects within the scene so as to optimise their deconstruction into mesh elements, and then to calculate a light emission value for each mesh element.

At step 303 the user defines movement of a virtual camera through the scene, defining a changing view that is known as a "walk through". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light emission of each element is projected with respect to the camera position into a two dimensional image plane. At step 306 additional view-dependent rendering is added. Radiosity generates light emission values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with light emission values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

An example of a scene for rendering using a radiosity procedure is illustrated in FIG. 4. The scene consists of a room including a first wall 401, a second wall 402, and a floor 403. A statue 404 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 406, the frame 408 of picture 405 also casts a slight shadow 409 against the wall 402.

The presence of a light source in the scene results in a quantity of light energy being introduced. This light energy is scattered throughout the scene in a complex way, that is dependent upon the reflectivities, shapes and positioning of objects within the scene. Radiosity simulation constructs a system of equations to represent these relationships, and is thereby able to determine light emission values that are very realistic.

Figure 5A:
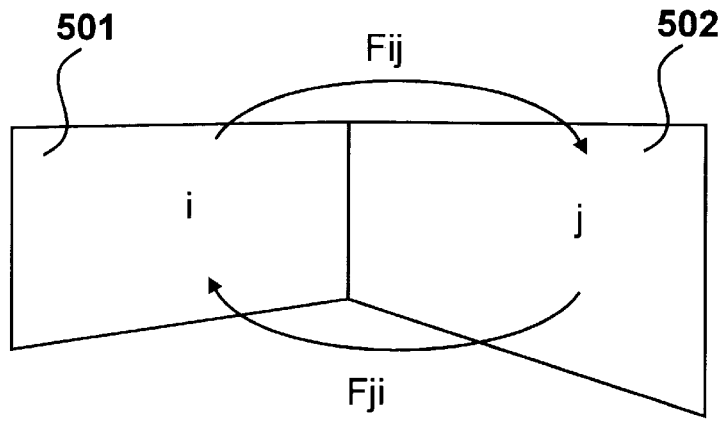
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 501 will be transferred to element 502, and vice versa. The actual proportion of light energy transferred from one element to another is called the form factor. If element 501 is considered to be a source element i, and element 502 is considered to be a receiving element j, the form factor for the transfer of light energy per unit area from i to j is denoted Fij. Similarly, the proportion of energy from element j transferred to element i is denoted Fji.

It can be seen from this example that calculating the form factor requires a determination of the visibility of the source element with respect to the receiving element. This is made more complex if a third occluding element is possibly present, which may totally or partially block light transfer between the elements for which the form factor is being calculated. In the event that a scene comprises only two elements 501 and 502, and one of these is a light source, it is possible to construct a pair of simultaneous equations that may be solved in order to obtain the light emission from each element. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B. The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product $B_iA_i$ which is then considered as equal to the self emission of the element $E_i$ multiplied again by its area $A_i$ plus the sum of all light received from all of the co-operating elements. Thus, for every single co-operating element in the scene, each instance of which is denoted by the letter j, the amount of light received by element i is equal to the flux density $B_j$ of element j multiplied by the area $A_j$ of element j multiplied by the form factor $F_{ji}$ expressing the proportion of light transferred from j to i. The sum of these values is then multiplied by the reflectance $R_i$ representing the reflectance of element i.

As previously stated, the procedure is underpinned by notions of conservation of energy. Therefore, in accordance with this principle, the form factor $F_{ij}$ for the transfer of light energy from i to j, multiplied by the area $A_i$ of element i is equal to the form factor $F_{ji}$ representing the transfer of light energy from j to i multiplied by the area $A_j$ of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density $B_i$ of element i is given by the source flux density $E_i$ of element i plus the reflectance $R_i$ multiplied by the sum for each element j, of flux density $B_j$ multiplied by the form factor $F_{ij}$.

The equation shown in FIG. 5D is the one used to determine light emission values for elements in a scene. In a simplistic approach, in a scene containing fifty thousand elements, the right side of this equation would have to be evaluated fifty thousand times in order to obtain an initial illumination value for a single element i. Thus, in order to calculate an initial illumination value for all fifty thousand elements, the right side of this equation must be evaluated fifty thousand times, fifty thousand times. Furthermore, this large number is also the number of form factors that need to be calculated before the system of equations can be solved. Thus a radiosity simulation utilising this approach is impractical for realistic image synthesis of scenes containing large numbers of elements.

Figure 6:
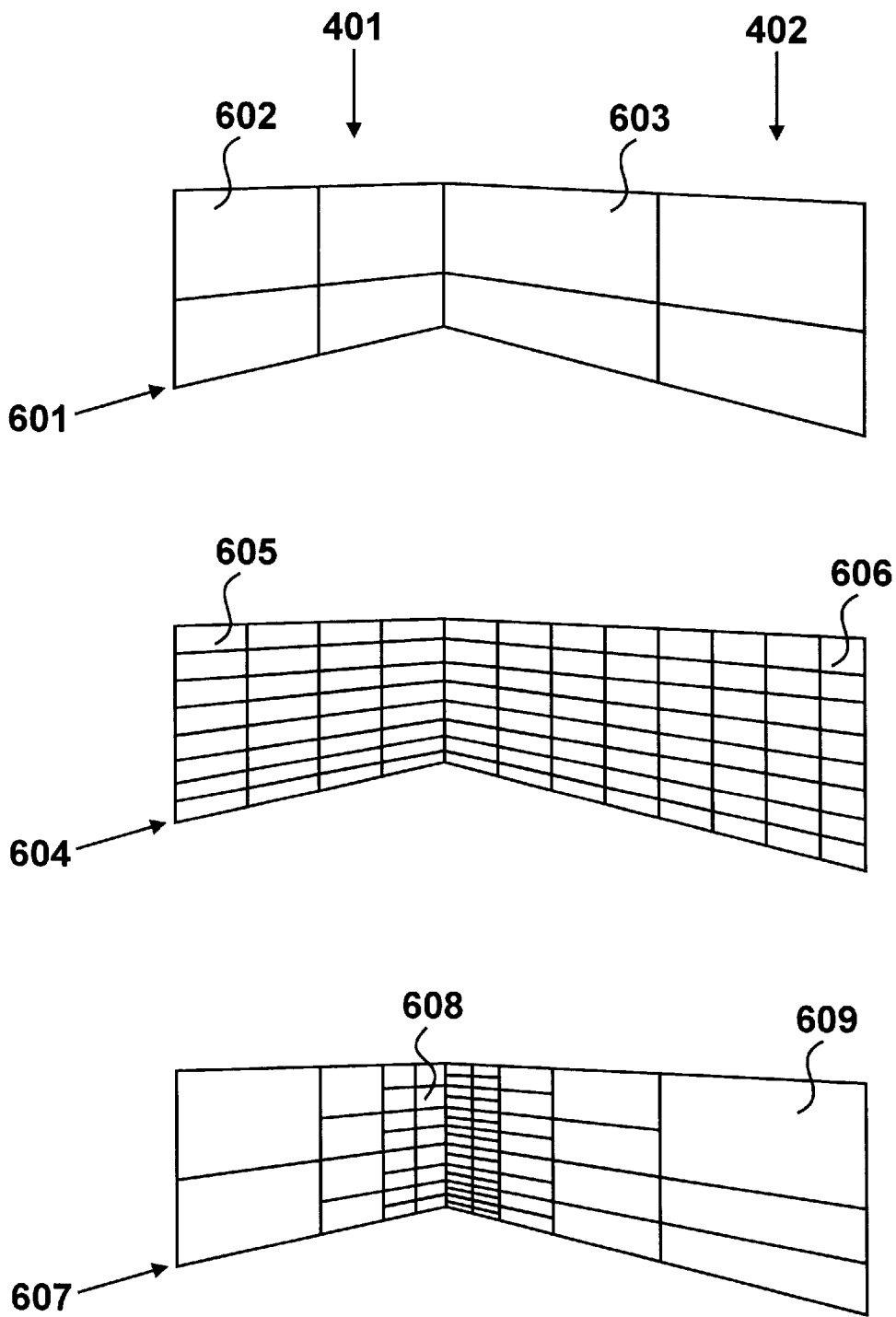
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artefacts. This problem may be understood by considering that, although illumination throughout the scene is nonlinear, the illumination gradient where the walls meet changes faster than in the middle of a wall. Thus, by rendering the scene at the level of resolution shown at 601.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The subdivisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photorealistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 405, are considered as forming a single cluster element. Interactions with distant elements, such as those comprising a wall 402, may then be expressed by the use of a single form factor, because the light reaching the wall from the statue is weak. The difference between the statue as it is, and the statue represented, for example, as a single radiating cylinder, will be below the required accuracy threshold when calculating the form factor for transfer from the statue to the wall. Closer surfaces, such as wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

Figure 7:
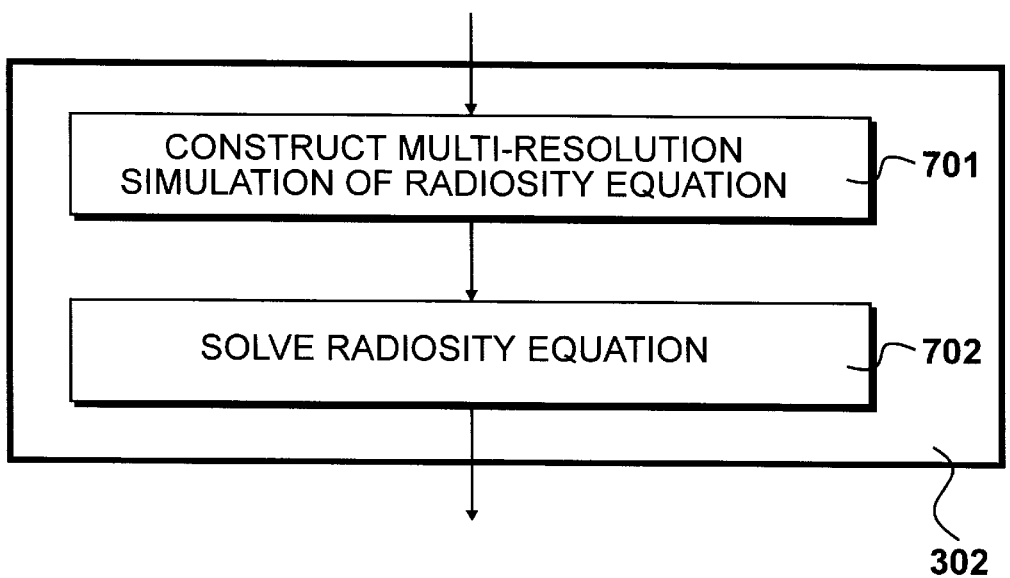
FIG. 7 details the process of radiosity simulation, shown in FIG. 3, including processes of constructing a multi-resolution representation of the radiosity equation, and solving the radiosity equation.

Procedure 302 for performing radiosity simulation is detailed in FIG. 7. At step 701 the multi-resolution representation of the radiosity equation is constructed. At step 702 the radiosity equation is solved.

Figure 8:
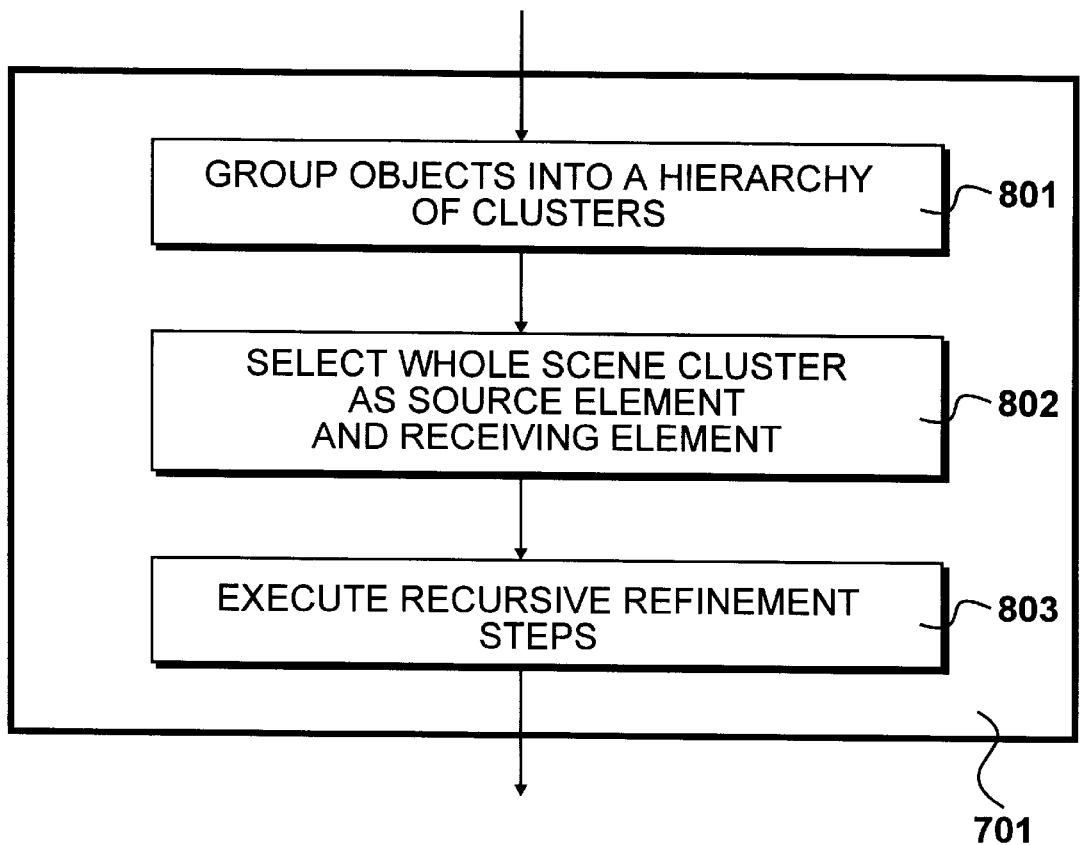
FIG. 8 details the process of constructing the multi-resolution representation of the radiosity equation shown in FIG. 7, including a process of executing refinement steps.

Procedure 701 for the construction of a multi-resolution representation of the radiosity equation is detailed in FIG. 8. At step 801 all of the scene is analysed such that a hierarchy of cluster elements is generated. At the top of this hierarchy is a cluster that represents the whole scene. Below this cluster are clusters that represent distinct groups of objects, related by their physical proximity. A method for hierarchical clustering of objects is described in "A Clustering Algorithm for Radiosity in Complex Environments", by Brian Smits, James Arvo and Donald Greenberg, Proceedings of SIGGRAPH '94, pp.435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This apparently unlikely starting point is never in actual fact considered as a genuine light path. However, it serves to initiate the recursive refinement process of step 803. At step 803, the whole scene is considered initially as emitting light to itself. The recursive refinement process considers this as resulting in an excessively bad quality of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
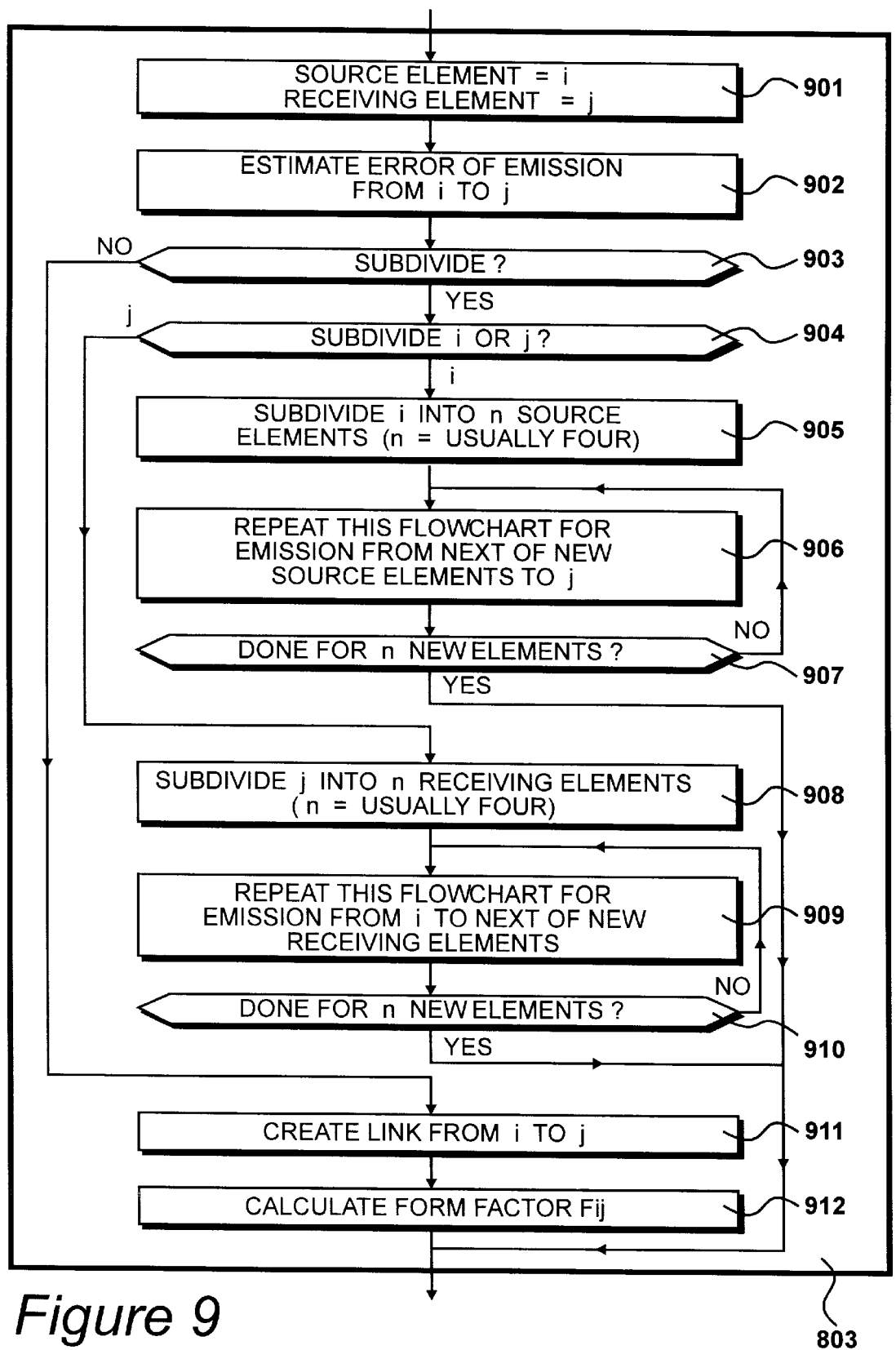
FIG. 9 details the process of executing refinement steps shown in FIG. 8, including steps for subdividing an element.

The recursive refinement process 803 shown in FIG. 8 is detailed in FIG. 9. A source element and a receiving element will have been selected by either process 802, or subsequent steps 906 or 909 within the same flowchart. These are now initially denoted as source element i and receiving element j at step 901. At step 902 an error is determined for the transfer of light from i to j wherein i and j are uniformly emissive. Upon initial execution of the flowchart of FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in the identification of component cluster elements, and/or component object elements. If, however, the element that is being subdivided is an object, the subdivision process at step 905 may create new elements. Typically, when a mesh is being created, this will result in the element being split up into four new elements. At subsequent levels of recursions, these mesh elements may themselves be further split, into usually four new elements, and so on, until the desired level of resolution is achieved in order to attain the required level of quality.

If an assessment is made at step 904 to the effect that the receiving element j is to be subdivided, control is directed to step 908 and a subdivision of j into receiving elements, in a similar manner, is performed at step 908.

At step 906, the processes of the flowchart shown in FIG. 9, and of which step 906 is a part, are repeated, by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive step at step 906, control is directed to step 907, where a question is asked as to whether any additional newly identified elements remain to be considered as emitters. If answered in the affirmative, control is directed back to step 906, where the next newly identified element is considered. Alternatively, all new elements have been considered. This represents the exit condition for the whole of the flowchart of FIG. 9.

Similar processes are performed at steps 908, 909 and 910, where newly identified elements are considered as receiving elements. In the recursive step 909 each newly identified receiving element is considered as receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels, for example between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
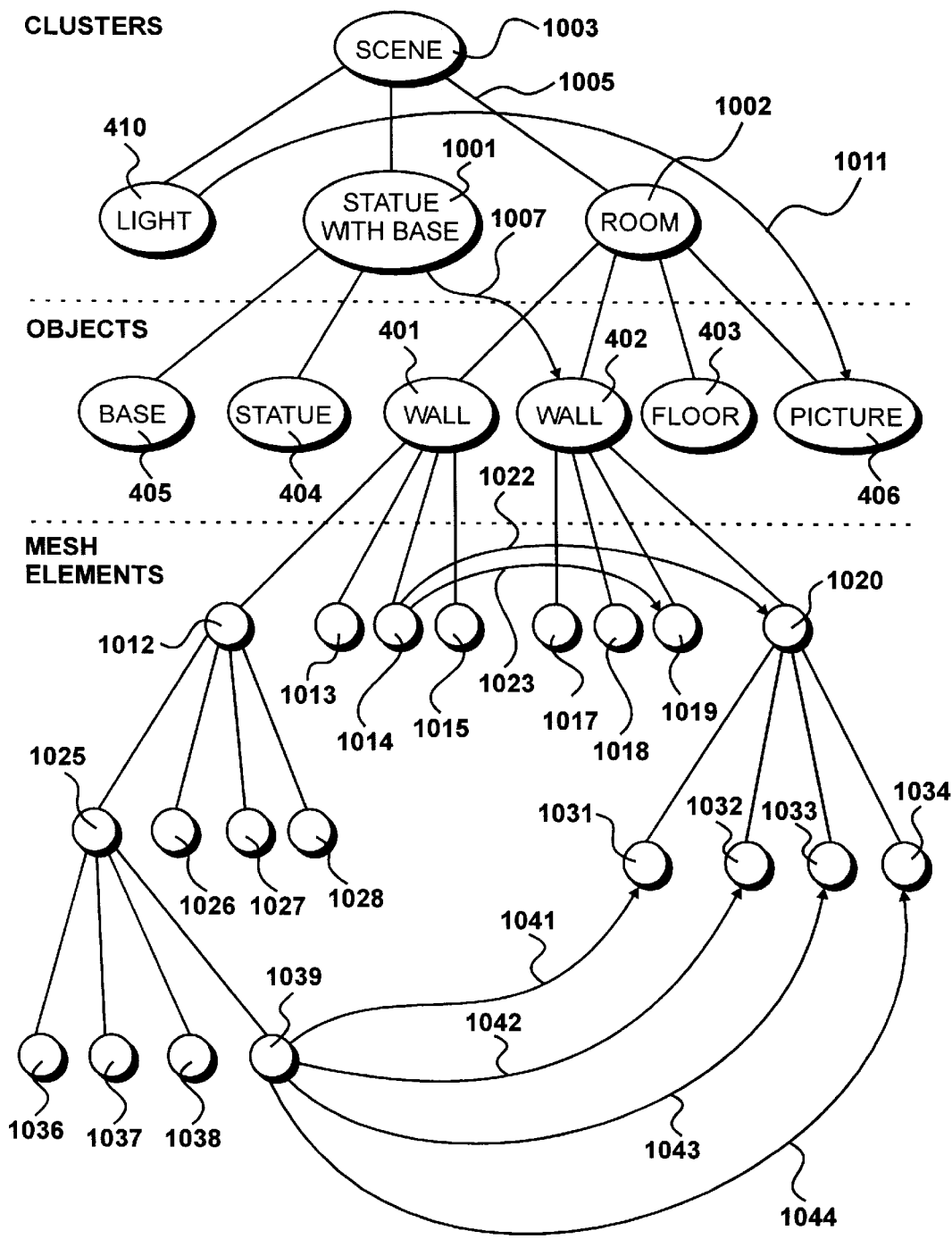
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 405, the statue 404, the first wall 401, the second wall 402, the floor 403 and the picture 406. Within the data structure, these objects are clustered so that the base 405 and the statue 404 may be considered as a statue with base cluster 1001. Similarly, the first wall 401, the second wall 402, the floor 403 and the picture 406 are considered as a room cluster 1002. The statue with base cluster 1001 and the room cluster 1002 are then unified into a scene cluster 1003, which also includes the light source 410.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting to elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
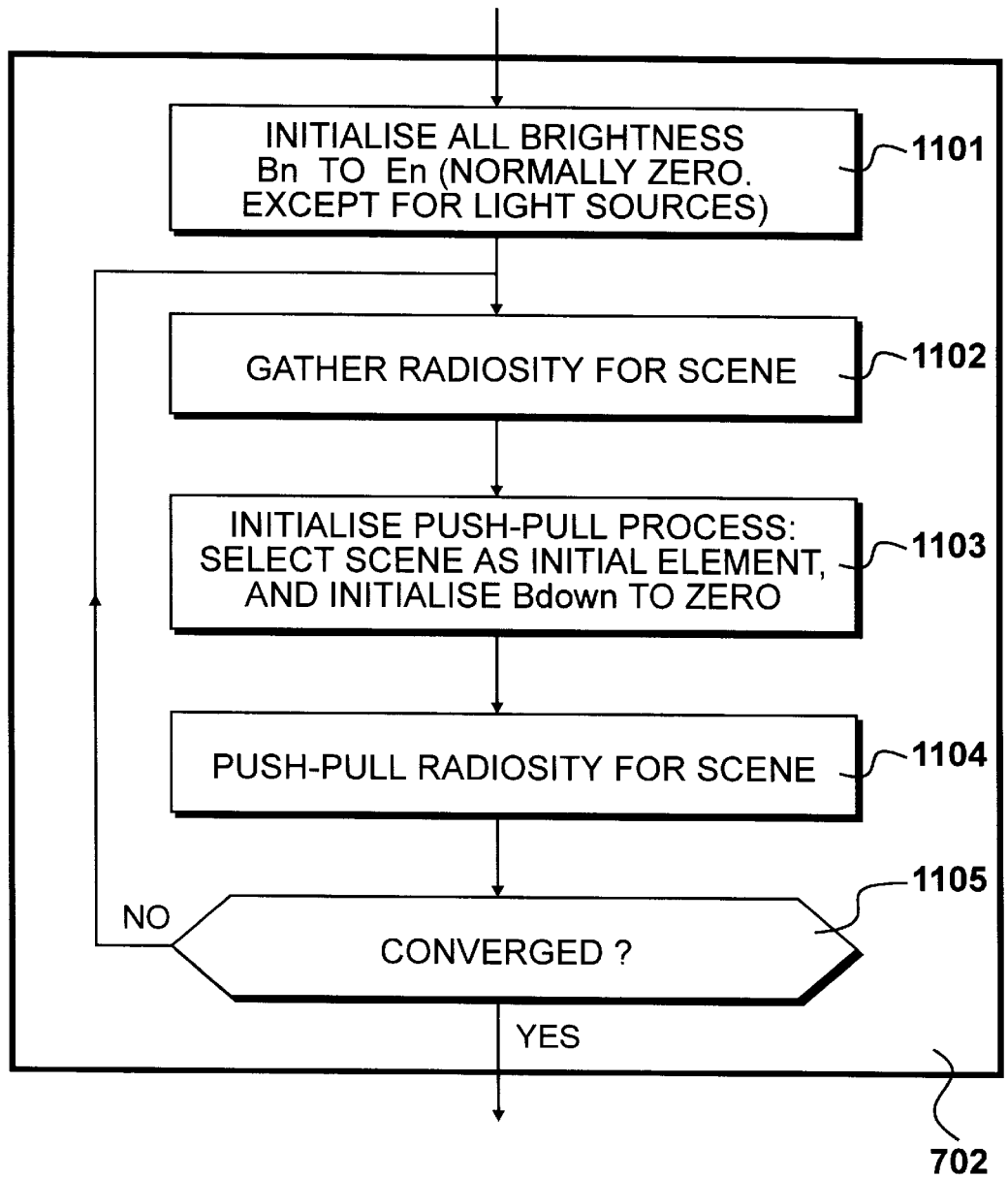
FIG. 11 details the process of solving the radiosity equation shown in FIG. 7, including a process of gathering the radiosity for the scene, and a process of push-pull radiosity for scene.

Procedure 702 for the solving of the radiosity equation is detailed in FIG. 11. Each element and object in the scene has an illumination value, and it is the purpose of the radiosity equation to determine an illumination value $B_i$ for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements $B_n$ are initialised to be equal to their self emission values $E_n$ which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its sub-elements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, the question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps will be required in order to reach a suitably stable set of illumination values.

Figure 12:
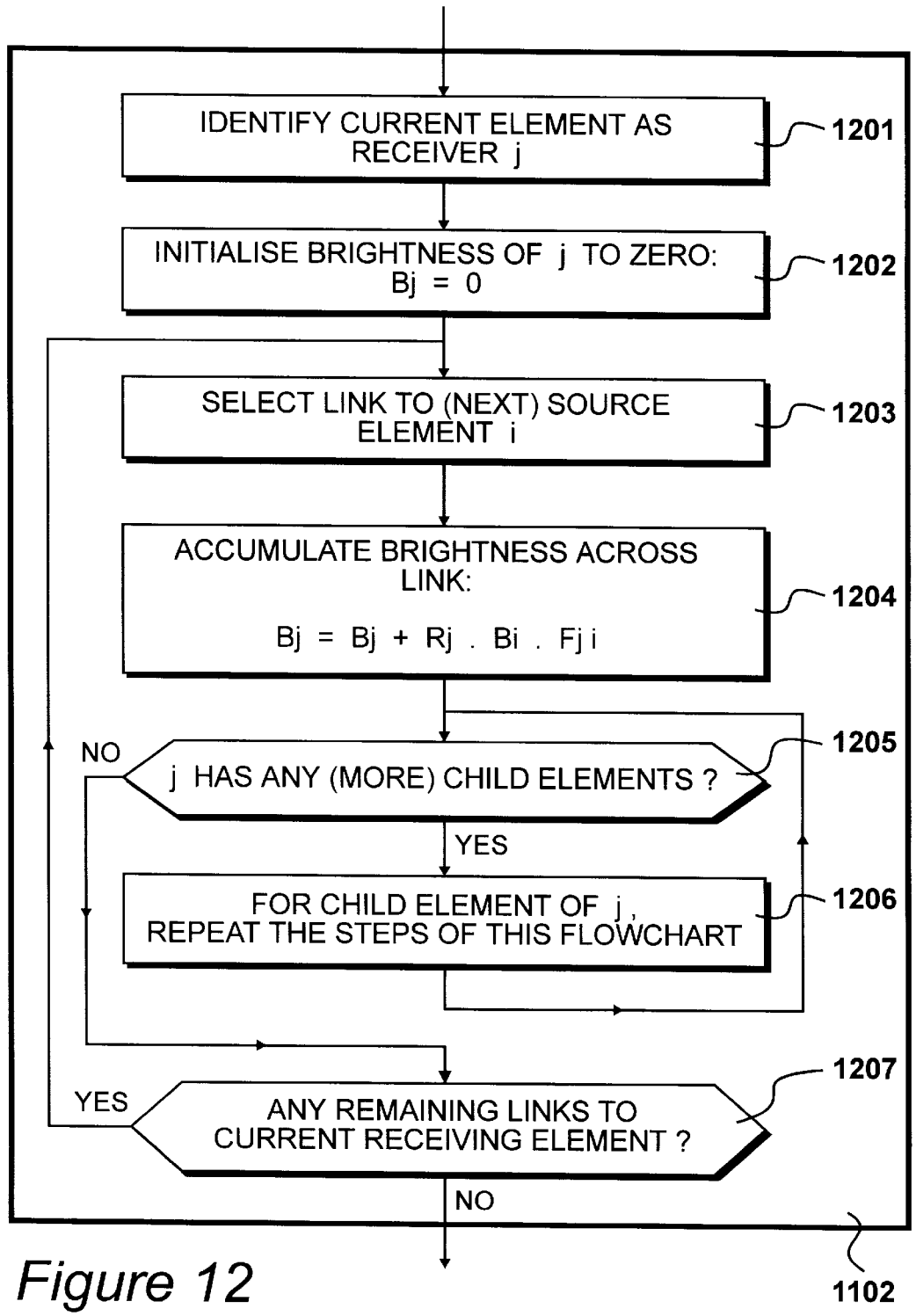
FIG. 12 details the process of gathering the radiosity for the scene shown in FIG. 11.

A known method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 the question is asked to whether element j has any more child or sub-elements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
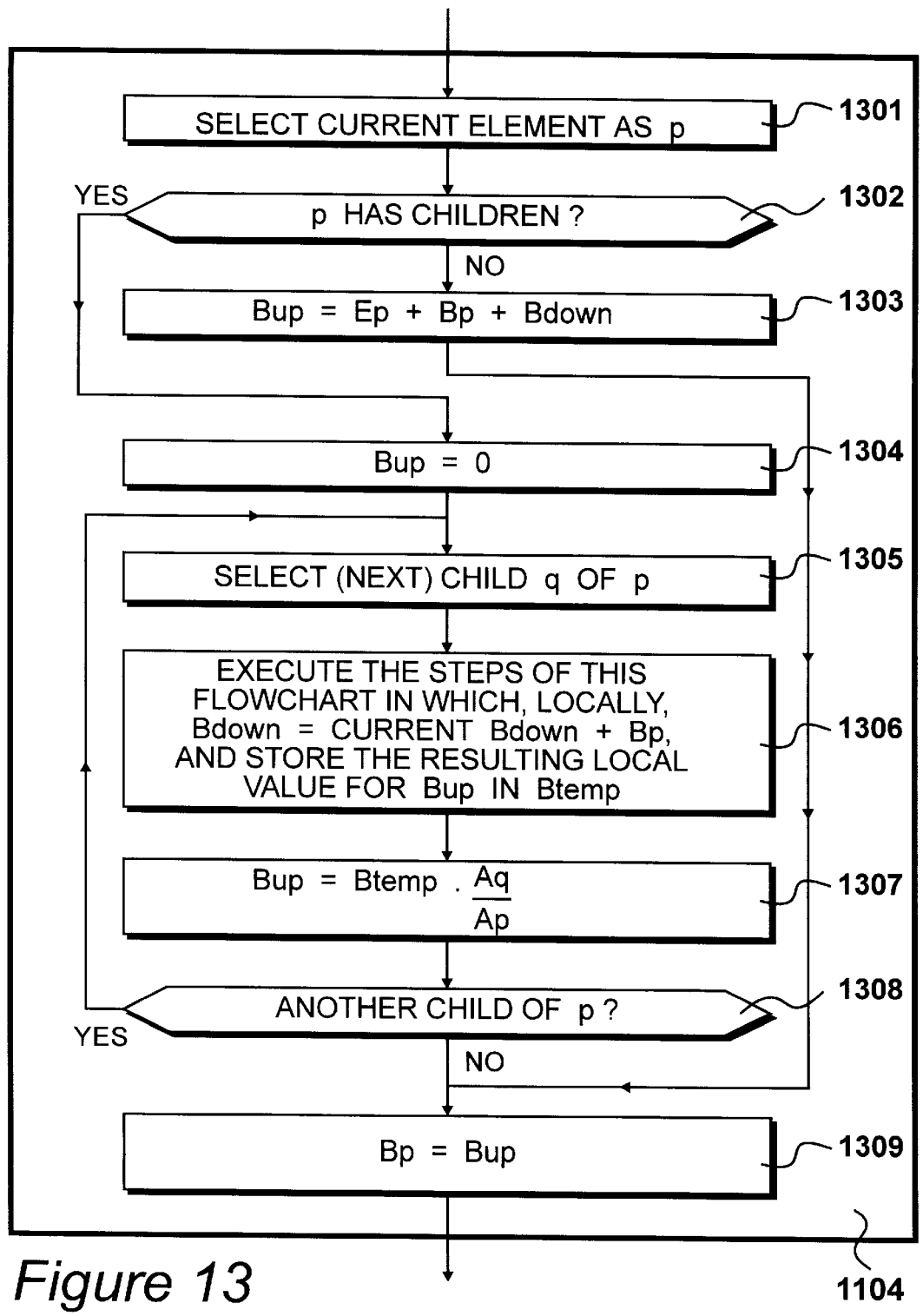
FIG. 13 details the process of push-pull radiosity for the scene shown in FIG. 11.

A known procedure for step 1103, the push-pull process for the illumination in the scene, shown in FIG. 11 is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result, in terms of a local value for Bup, is stored in variable Btemp. Thereafter, control is directed to step 1307.

At step 1307 variable Bup is set equal to value Btemp, the local value determined by the recursive call to procedure 1306 which is then multiplied by the area of the child divided by the area of the parent to compute an area average.

At step 1308 a question is asked as to whether another child of p is present and, when answered in the affirmative, control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps_1, and then at step 702, the radiosity equation is solved to yield a first solution. On the next iteration, the error tolerance is reduced, to eps_2. However, the multi-resolution representation constructed at step 701 in the previous iteration is already valid down to the eps_1 level of error tolerance. Thus, to continue to the reduced level of error tolerance, given as eps_2 , the pre-existing multi-resolution representation can be continued by further addition of mesh elements and establishing links and there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factor. This information can be used to improve the accuracy by which errors are predicted, such that even pairs of surfaces with large form factors do not need to be respectively meshed, if the actual light that would be transferred across those links is insignificant. This form of iterative refinement is known as BF refinement.

In order to reduce the amount of memory that is required to store the structures shown in FIG. 10, master elements are used, onto which may be mapped objects or surfaces that have similar geometric characteristics. Thus, the wall at 401, shown in FIG. 10, has a surface that is constructed from a square plane in canonical space. This has been scaled, rotated and translated in three-dimensions into an appropriate orientation as indicated in FIG. 4. The other wall, 402, also shown in FIG. 10 and FIG. 4, similarly has a surface that has been created from the same square plane in canonical space, but which has been scaled, rotated and translated differently. Each of the walls 401 and 402 has been subdivided into a hierarchy of mesh elements, as indicated at 607. Each of the mesh element sub-divisions, as illustrated in FIG. 10 at 1012 to 1015 and 1025 to 1028, may be considered as a sub-division of the common master element in canonical space. In this way, it becomes possible to reduce the amount of memory required to define the data structure shown in FIG. 10. By considering the mesh element subdivisions as being performed within a single unique master element, as opposed to two distinct wall objects, data that defines the relative positions of sub-divisions, along with other properties of mesh element data, may be stored only once, for possible use in the surfaces of many objects.

Figure 14:
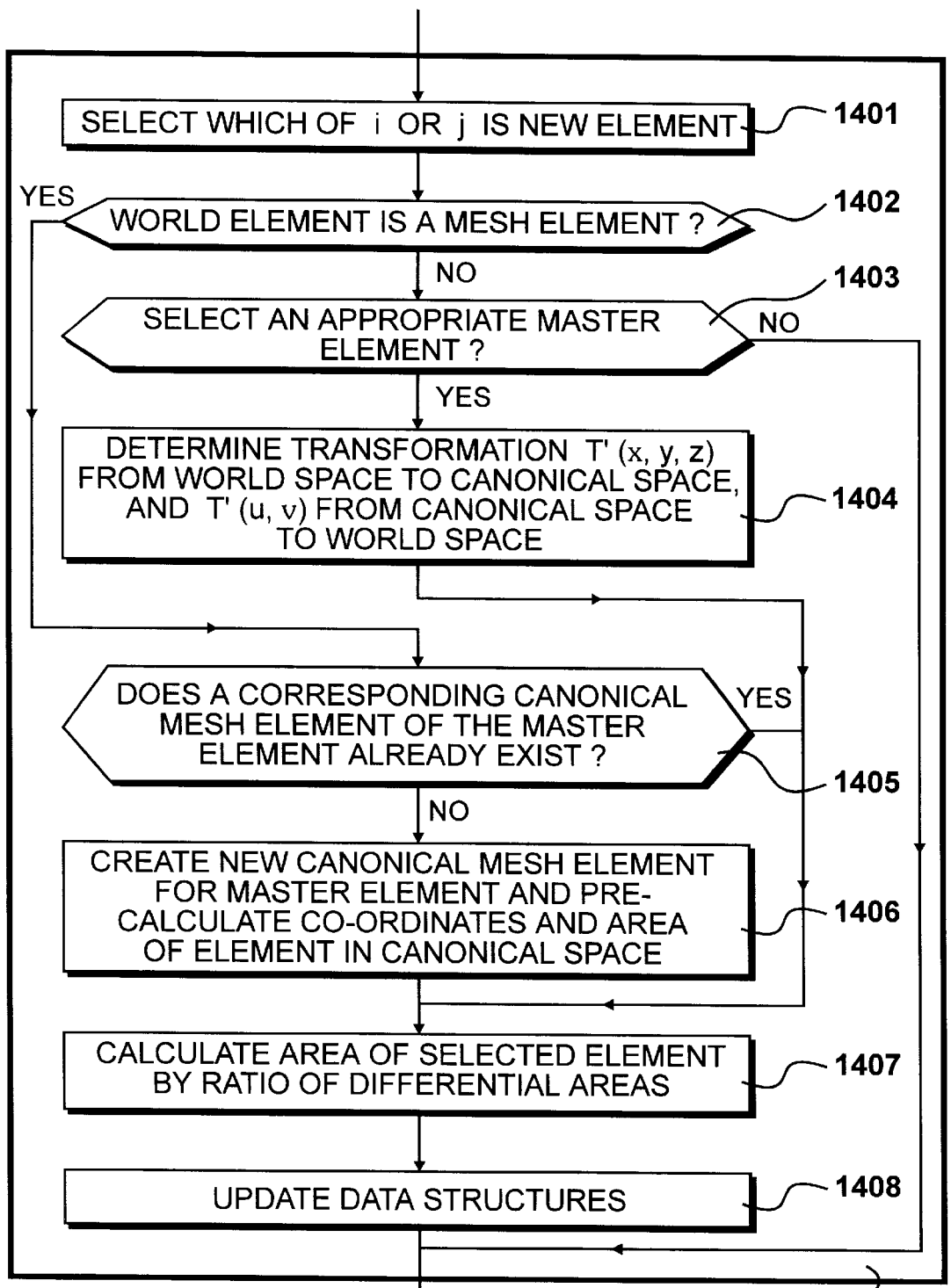
FIG. 14 details the steps for subdividing an element shown in FIG. 9, including calculating an area.

Steps 905 and 908 in FIG. 9 where elements are subdivided are detailed in FIG. 14. An element that is to be subdivided will already have a mapping from a master element or shape in canonical space. Thus it is possible that the master shape is already subdivided in accordance with the required subdivisions for the subdivisions of the element in world space. At step 1401, a question is asked as to whether the master element in canonical space has already been subdivided. If answered in the negative, control is directed to step 1402, where appropriate subdivisions are made of the master element in canonical space. Alternatively, if subdivisions have already been made, control is directed to step 1403. At step 1403, the element in world space is subdivided. Thus, upon completion of step 1403, both the master element and the corresponding element in world space will have been subdivided in similar ways; only the geometries being different.

At step 1404, the newly created elements in world space are associated with their respective elements in canonical space. This is a step in which data structures are modified and updated. At step 1405, an association is made between the newly created element in world space and transformation functions for these elements. The surface element in world space that was originally subdivided at step 1403 is already associated with an element in canonical space. In order to convert between the two, that is to say, in order to draw the world surface from data mainly stored with respect to the master shape in canonical space, a forward transformation function M(u,v) is used, that, when applied to the geometry of the element in canonical space, results in a transformation into the geometry of world space. In this way, by using many transformation functions, a single master element may be used to generate many different surfaces in world space. Furthermore, an inverse transformation M'(x,y,z) is used to convert back from world space to canonical space, when calculations of this sort are required.

The element that has now been subdivided into four new elements has a transformation function M(u,v). This same transformation function is used for the newly created elements that are subdivisions of the original element. The only difference being that different ranges of values for u and v will be used to generate them. Hierarchical subdivisions of a given surface will therefore use the same pair of forward and backward transformation functions M and M', in order to convert back and forth between canonical and world space.

At step 1406, in accordance with the present invention, a calculation is made of the areas of the newly created elements, in world space, and, if necessary, in canonical space.

Figure 15:
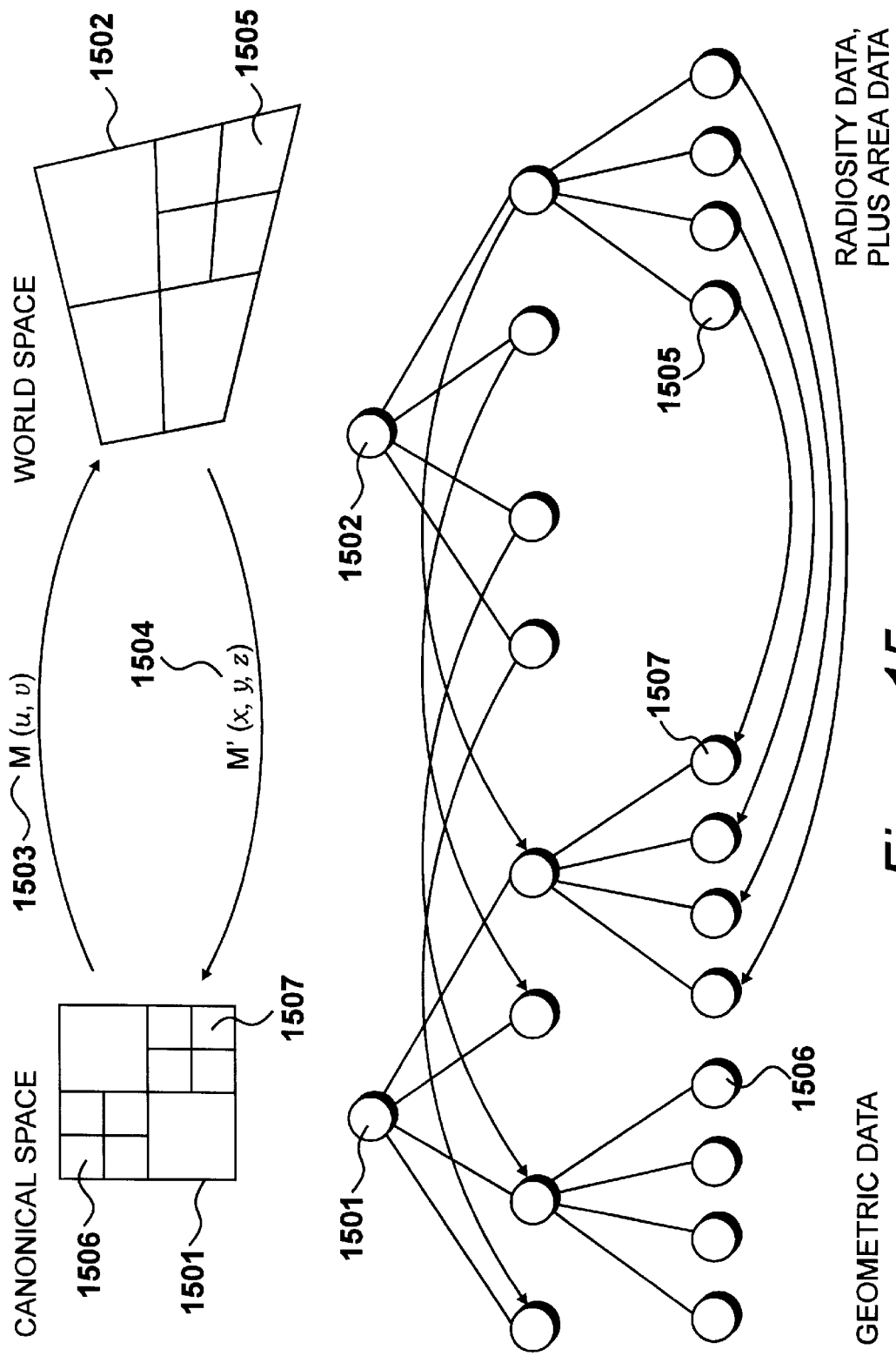
FIG. 15 illustrates an example of data structures resulting from the steps detailed in FIG. 14, including a first master element.

The results of performing the steps shown in FIG. 14 are illustrated in FIG. 15. A unit square master element 1501 in canonical space is the master element for an element 1502 in world space. Transformation functions 1503 and 1504 are identified for translating between co-ordinates of the master element in canonical space and co-ordinates of the element in world space 1502.

The element in world space is subdivided into smaller elements, including mesh element 1505. However, the canonical master element 1501 has been used as a master element for more than one world element, which has resulted in additional hierarchical mesh elements 1506 as well as the mesh elements 1507 that correspond to the real world mesh element 1505 of the world space element 1502.

In FIG. 15, the correspondence between data structures representing the world space element 1502 and the canonical master element 1501 is shown with links between the components of elements in world space and canonical space, indicating the transformation using the transformation function 1504 between world space and canonical space. The data structures for the master element 1501 in canonical space include geometric data. Thus, however many subdivisions are required for the canonical master element, geometric information, representing the co-ordinates of the sub-divisions, is stored only once for any number of corresponding elements in world space. This represents a considerable saving in the amount of memory that is required in order to store information when calculating the multi-resolution simulation of the radiosity equation. Certain types of frequently used data are pre-calculated. Such data may be stored within the structure shown in FIG. 10, uniquely for each world space element. In the preferred embodiment, this data includes the area of the element. This data is accessed several times during the process of solving the radiosity equation, as indicated at step 702. By storing area data uniquely for each world element, it becomes unnecessary to recalculate it every time the data is required. Thus, by storing frequently accessed data locally and uniquely for each world space element, and storing other data in the data structure for the canonical master element, a useful compromise between speed and memory requirements can be achieved.

Figure 16:
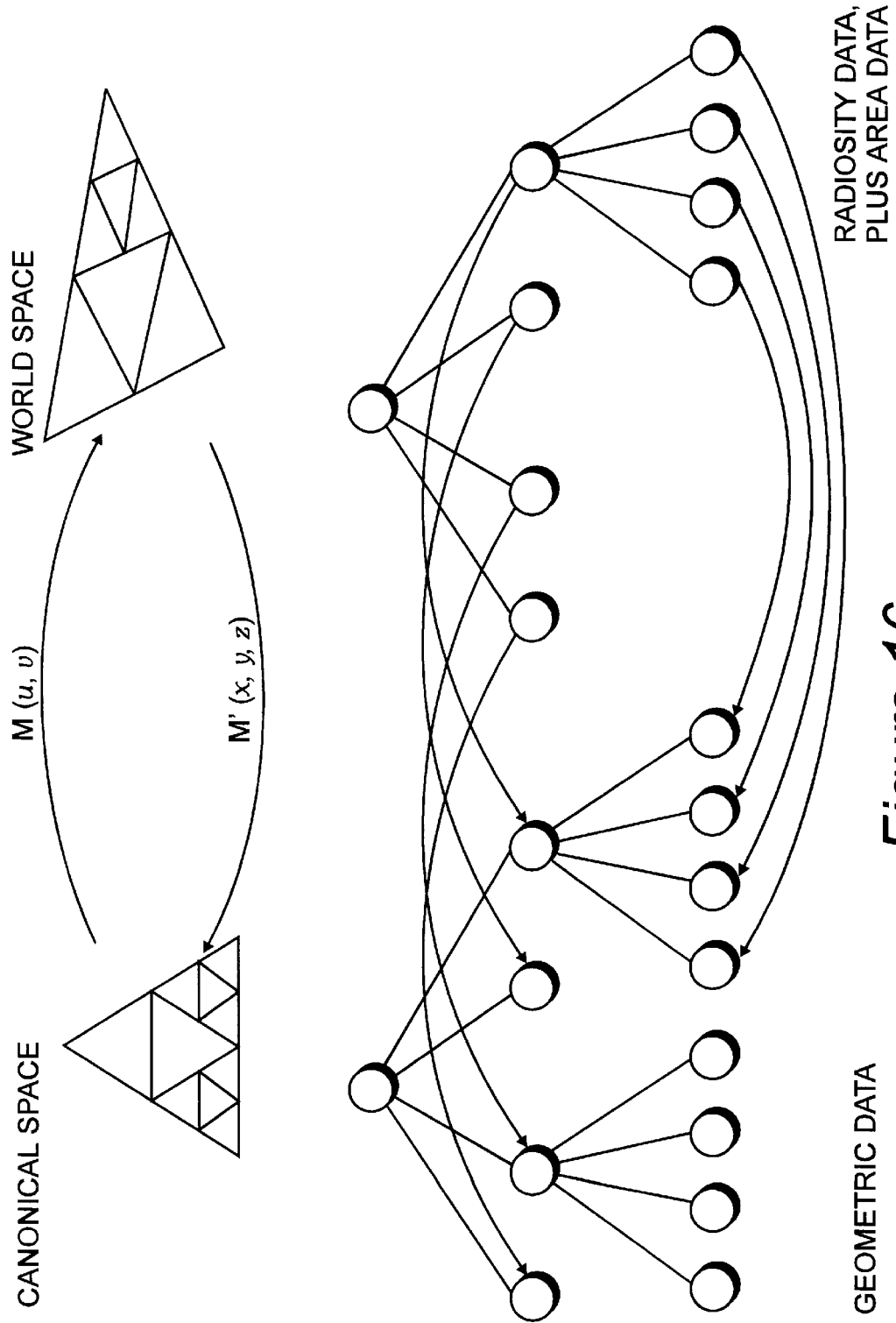
FIG. 16 illustrates a further example of data structures created as a result of executing the steps shown in FIG. 14, including a second master element.

Several different master shapes may be used, in order to efficiently represent the variety of surfaces that are likely to be encountered within a three-dimensional scene to be simulated using radiosity. In FIG. 16, a triangular master shape is illustrated, along with corresponding transformation functions between its master elements and real world elements that may be efficiently mapped on the triangular master element. As with the example shown in FIG. 15, the canonical master shape has been meshed to a higher degree than the corresponding world space surface which is illustrated, and this results from association with a plurality of triangular world space surfaces that are meshed to varying degrees of resolution. FIG. 17 illustrates two types of master shapes, the square master shape 1501, which has been shown in FIG. 15, and the triangular master shape 1701 which has been indicated in FIG. 16. In the invention, a method is provided for determining the area of an element in world space, given the area of the corresponding element in canonical space.

The area of an element in the hierarchical mesh of a master shape is usually straightforward to determine. Calculation of the area of the corresponding real world element may not be straightforward. For example the area of a canonical disk of radius one is equal to Pi, but the area of a disk subjected to a non-uniform scale and shear transformation, a kind of lop-sided ellipsoid, would not be as easily computed. The invention enables the area of a world space element to be calculated from the corresponding area of the master element in canonical space.

Figure 18:
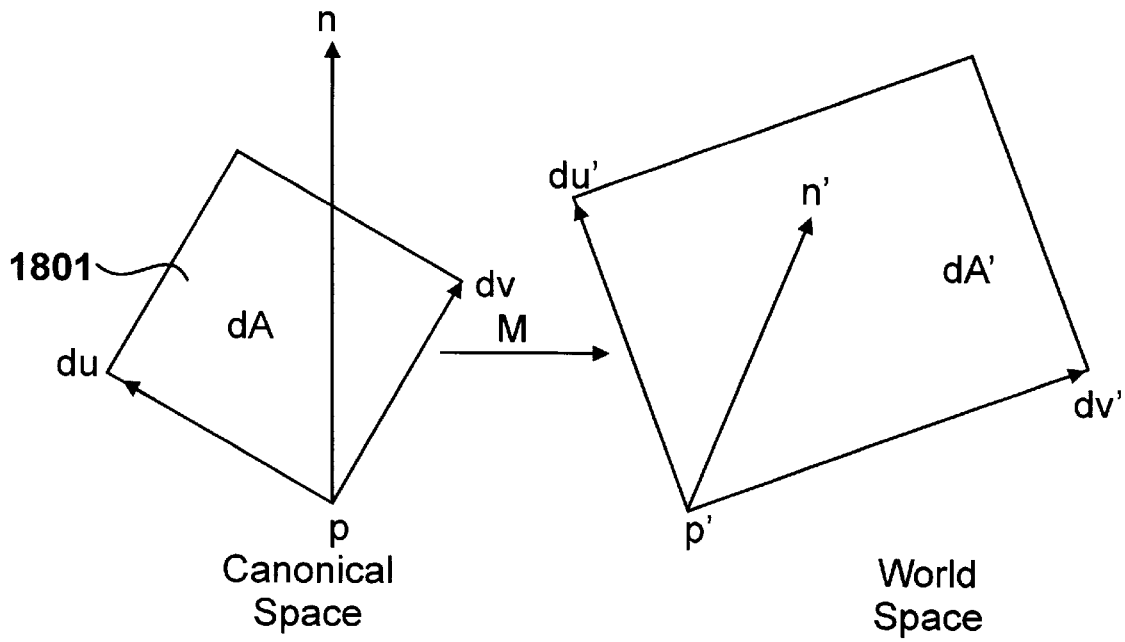
FIG. 18 details the step of calculating an area shown in FIG. 14, in accordance with the present invention.

The method for converting an area in canonical space into a corresponding area for any element, that has been generated by an affine transformation of the master element, is detailed in FIG. 18. A master element 1801 in canonical space is shown, having a point P, and two differential tangent vectors to the point P, namely du and dv, that define a differential area dA. A normal vector, n, to point P is also shown. The normal vector n is equal to the cross product of vectors du and dv. An affine forward transformation matrix M may be applied to the master element to position, scale and rotate the master element for orientation in world space. In world space, the transformed vectors are du', dv' and n', relative to point P', and having a transformed differential area dA'.

The problem is to determine a transformed area A' from the original area A. This is expressed in the equation shown at 1802. In this, it is shown that the area of an element in world space, A', may be determined by integrating a function f(A). f(A) may then be expressed in terms of a ratio of differential areas dA' by dA, as shown at 1803. The value of dA is determined as being the magnitude of the cross product of differential tangent vectors du and dv. However, determining the value dA' may require more computations. This is shown at 1804.

Area dA' is equal to the magnitude of the cross product of du' and dv'. Furthermore, du' is given by M.du and dv' is given by M.dv, where M is the forward affine transformation function used for mapping between canonical space and world space for the element whose area is to be determined. This results in the expression shown at 1804, which is a non-trivial calculation. In addition to requiring two matrix-vector multiplications, du and dv are not readily available and must themselves usually be determined specifically for the purposes of performing this calculation.

At 1805, an improved method for determining area by the ratio of differential areas is shown. At 1805, the transformed differential area, dA' is shown as being given by the magnitude of the product of the adjoint of the forward transformation matrix M and the untransformed normal, n. The normal n, is usually available without the need to perform additional calculations unique to area calculation. This gives a simple expression for f(A), as shown at 1806, that may be used in the integration shown at 1802. The invention is to use the relation shown at 1805 in order to simplify the calculation of areas.

The proof of the relation shown at 1806 may be established in two stages, by comparing the magnitude and direction of the vector obtained by the known method, shown at 1804, with the magnitude and direction of the vector obtained by the new method, shown at 1805. Firstly the magnitude of these two vectors is considered. This can be shown to be equal by expansion of terms, where each individual manipulation of a matrix row and column is written out symbolically and the results compared. This can be readily verified using a symbolic mathematical computer program. The second stage is to show that the two vectors are parallel. This is a known property and is detailed in Appendix A, pages 29–30, Computer Graphics, Volume 18, Number 3, July 1984.

For surfaces that are planar, the normal vector is the same at any point on the surface. As a result, the integrand shown at 1802 is constant. Furthermore, in many cases, the normal vector, n, is a unit vector in canonical space, and its magnitude is unity. Given this fact, the calculation of area of many surfaces is reduced to the simple relation shown at 1807. Given that many elements share the same transformation function M, these same elements share the adjoint matrix. The expense of obtaining the adjoint matrix is therefore shared between all elements sharing the same transformation function. In practice, a considerable computational saving is therefore made, by replacing the calculation shown at 1804 with the one shown at 1805.

When a non-planar surface is to be considered, the integration shown at 1802, may be implemented using numerical quadrature, using the relation shown at 1805.

Thus the invention is able to take advantage of geometric data within master elements in order to quickly and efficiently determine the areas of real world elements, which are of key importance in establishing the construction and solution of the multi-resolution simulation of the radiosity equation.

Figure 19:
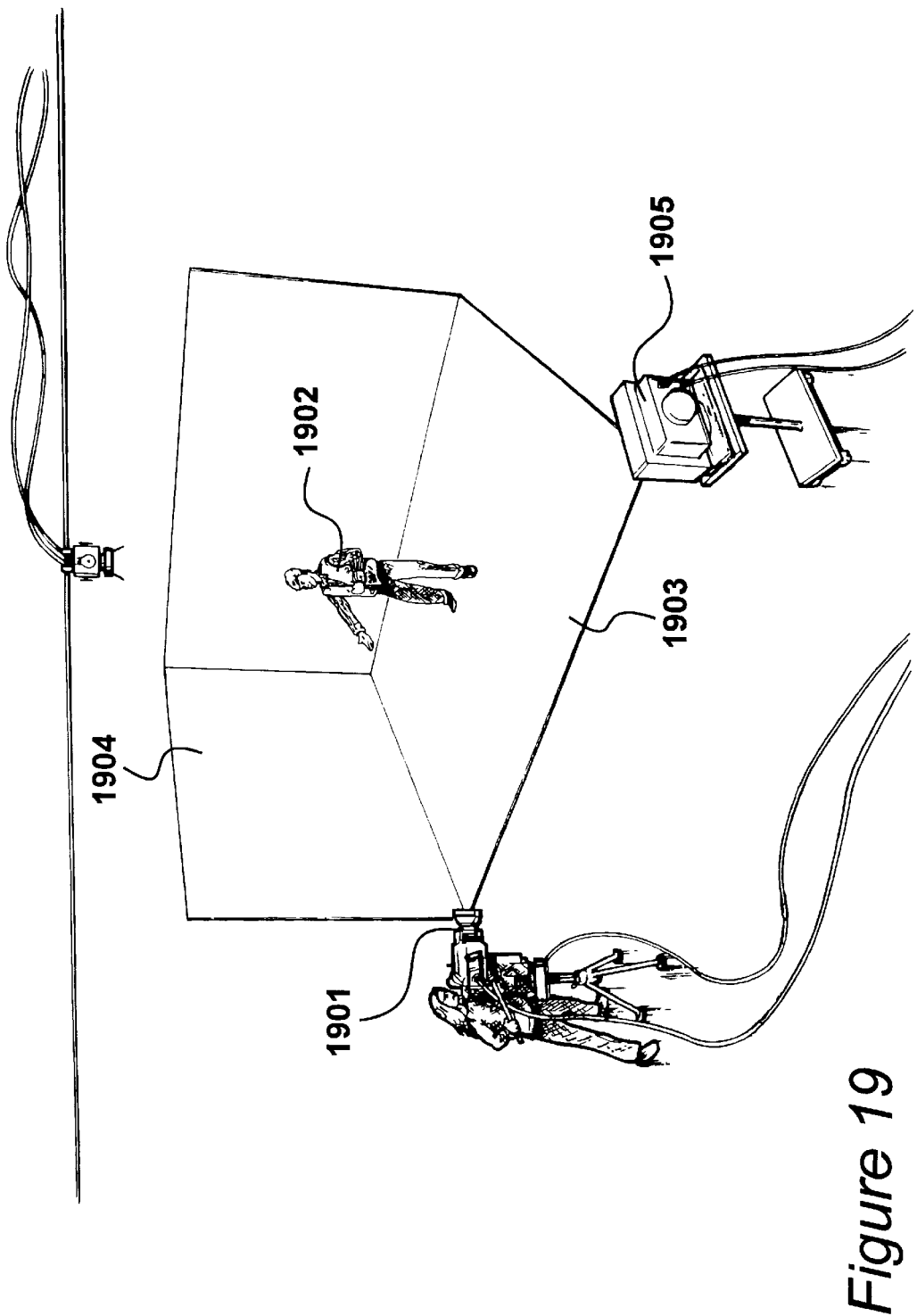
FIG. 19 shows a virtual set, for generating live video data.

The artificial scene shown in FIG. 4 may be combined with images from a real studio, such that artificial objects, walls and studio features may be superimposed upon a real studio in which minimal features are present. The combination of real and artificial images in this way results in the creation of a virtual set, in which real and virtual objects may be mixed. An example of a virtual set is shown in FIG. 19. A camera 1901 generates live video image data, as well as serial positioning data and lens data. The camera is aimed at talent 1902, located in the centre of a blue screen environment, comprising a blue screen floor 1903 and walls 1904. The blue colour of the walls is carefully controlled and calibrated in such a way as to facilitate automatic replacement of any blue areas of the subsequently processed camera images with a corresponding virtual image. A monitor 1905 facilitates visual feedback for the talent, such that it is possible to interact in a more natural way with objects in the virtual world.

Figure 20:
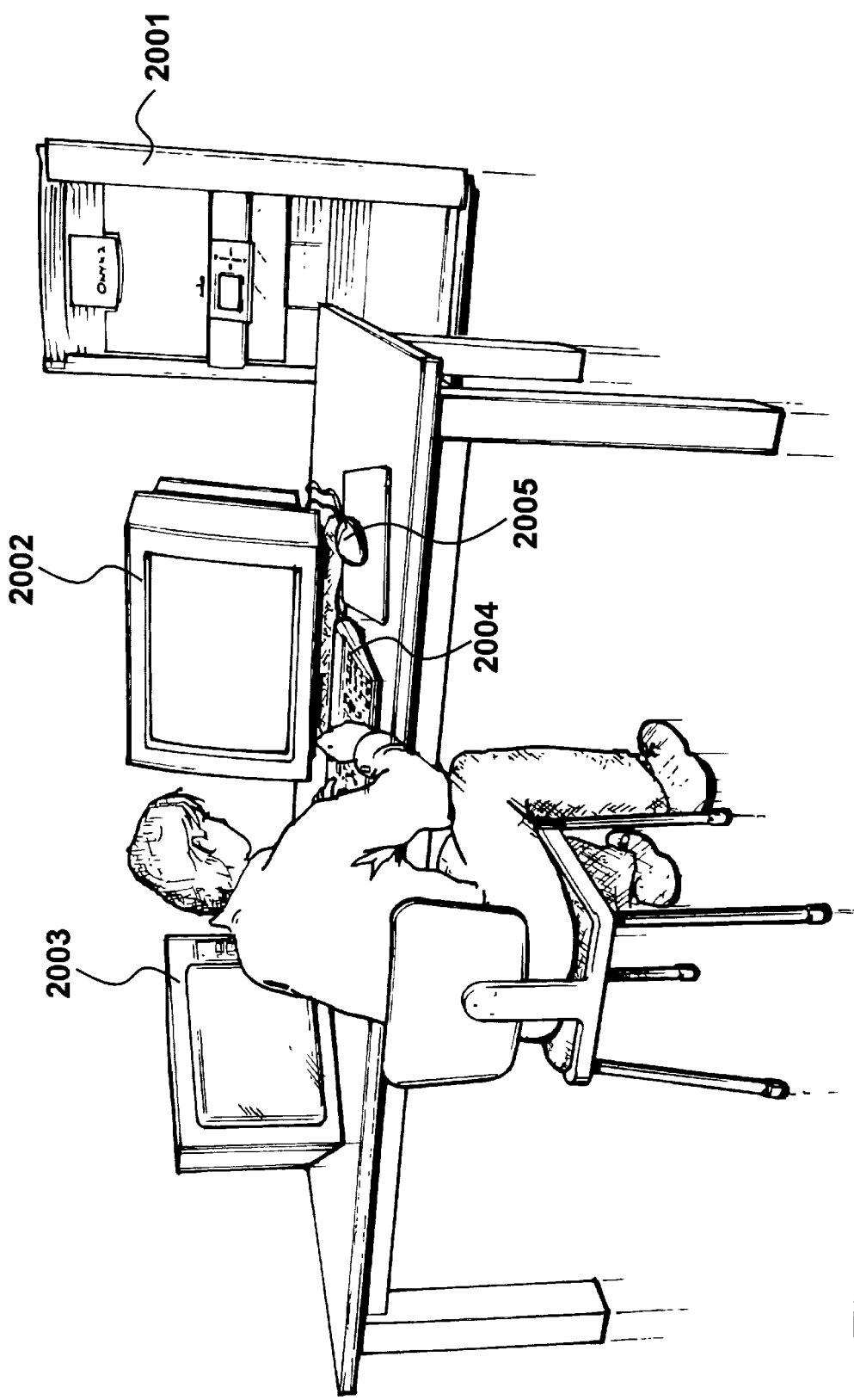
FIG. 20 details equipment for combining camera data with scene data in real-time.

Equipment for compositing image data from the virtual set shown in FIG. 19 with artificial scene images such as the one shown in FIG. 4, is detailed in FIG. 20. A main processor 2001, such as an Onyx2™, manufactured by Silicon Graphics Inc, receives image and position data signals from the camera 1901 shown in FIG. 19. The position information from the camera, together with lens data, including zoom and focus, enable a calculation to be made of the viewpoint of the camera with respect to the virtual set. The walls of the virtual set are calibrated in position, so that at least one of either the floor or the two walls may be used as a reference plane that will match with a corresponding floor or wall plane in the artificial scene shown in FIG. 4. Commands for controlling the virtual environment are performed by the operator using a mouse 2005, a keyboard 2004 and a monitor 2002. A high quality broadcast monitor 2003 is also provided on which to view the results of the compositing process.

The operator has control over such parameters as blue screen removal, floor plane or wall plane tolerance mapping, quality control, ensuring that calibrations are maintained and so on. The main processor 2001 renders the scene shown in FIG. 4 in accordance with the radiosity simulation process described previously. Once this step has been performed, it then becomes possible to render the scene from any viewpoint. In a virtual set, the viewpoint is defined by the camera position and lens conditions. Thus, the main processor 2001 performs radiosity rendering in response to signals from the camera 1901. The rendered scene is then keyed with the real video data using a blue screen keyer process, such that the talent 1902 appears to be in a highly realistic scene, comprising the objects shown in FIG. 4. As is known, additional lighting effects may be added, in order to support view dependent lighting.

What we claim is:

1. A method of generating image data from scene data, in which said scene data includes object elements in world space; wherein
    said object elements each have a surface that may be subdivided into a mesh; and
    a plurality of said objects have a surface that is created in response to data from a master shape in canonical space; such that
    said surface is created by an affine transformation of said master shape;
    said master shape has a known area;
    a corresponding area of said surface is calculated with reference to the adjoint matrix of said affine transformation; and
    said surface areas in world space are used to determine light emission characteristics for said scene.

2. A method according to claim 1, wherein said affine transformation is applied to mesh elements in said master shape to generate mesh elements in world space, wherein said adjoint matrix of said affine transformation is determined once for a selected surface; and
    said adjoint matrix is applied a plurality of times to determine the areas of mesh elements of said selected surface.

3. A method according to claim 2, wherein said master shape is meshed hierarchically such that said surfaces derived from said master shape derive their respective mesh elements from said master shape.

4. A method according to claim 1, wherein said master shape is planar.

5. A method according to claim 4, wherein said surface area is calculated by a matrix-vector multiplication between said adjoint matrix and a normal vector to said master shape; a magnitude is obtained, and
    said magnitude is multiplied by the corresponding area in said master shape.

6. A method according to claim 1, wherein said master shape is non-planar, and
    an area function is determined with reference to a ratio between a differential area of said surface in world space and a corresponding differential area of said master shape in canonical space, said differential area in world space being determined with reference to said adjoint matrix and a normal vector; and
    a numerical quadrature integration is performed with reference to said area function in order to determine the area of said surface in world space.

7. A method according to claim 1, wherein an area of said surface in world space is determined by the product of a corresponding area of said master shape in canonical space; and the magnitude of the matrix-vector multiplication between said adjoint matrix and a normal vector to said area of said master shape, wherein said normal has unit magnitude.

8. A method according to claim 1, wherein a method of area calculation is selected in response to the condition of planarity or non-planarity of the master shape.

9. A method according to claim 1, wherein a first master shape is a square in canonical space, and a second master shape is a triangle in canonical space.

10. A method according to claim 1, wherein said image data is rendered from a view determined in response real camera positional data within a to virtual set.

11. Apparatus for generating image data from scene data, including processing means, and storage means for storing instructions for said processing means and for storing data representing said scene, wherein
    said scene includes object elements in world space;
    said object elements each have a surface that may be subdivided into a mesh; and
    a plurality of said objects have a surface that is created in response to data from a master shape in canonical space, such that said instructions are configurable to control said processing means to perform the steps of:
    creating said surface by an affine transformation of said master shape, wherein said master shape has a known area;
    calculating a corresponding area of said surface with reference to the adjoint matrix of said affine transformation; and
    using said surface areas in world space to determine light emission characteristics for said scene.

12. Apparatus according to claim 11, wherein said processing means is configurable to apply said affine transformation to mesh elements in said master shape to generate mesh elements in world space, such that said adjoint matrix of said affine transformation is determined once for a selected surface, and applied a plurality of times to determine the areas of mesh elements of said selected surface.

13. Apparatus according to claim 12, wherein said master shape is meshed hierarchically such that said surfaces derived from said master shape derive their respective mesh elements from said master shape.

14. Apparatus according to claim 11, wherein said master shape may be planar.

15. Apparatus according to claim 14, wherein said surface area may be calculated by a matrix-vector multiplication between said adjoint matrix and a normal to said master shape, thereby obtaining a magnitude; and
multiplying this magnitude by the corresponding area in said master shape.

16. Apparatus according to claim 11, wherein said master shape may be non-planar, wherein
said processing means is further configurable to perform the steps of:
calculating an area function with reference to a ratio between a differential area of said surface in world space and a corresponding differential area of said master shape in canonical space, said differential area in world space being determined with reference to said adjoint matrix and a normal; and
calculating a numerical quadrature integration with reference to said area function in order to determine the area of said surface in world space.

17. Apparatus according to claim 11, wherein an area of said surface in world space may be determined by the product of a corresponding area of said master shape in canonical space, and the magnitude of the matrix-vector multiplication between said adjoint matrix and a normal vector to said area of said master shape, wherein said normal vector has unit magnitude.

18. Apparatus according to claim 11, wherein said processing means is further configurable to select a method of area calculation in response to the condition of planarity or non-planarity of the master shape.

19. Apparatus according to claim 11, wherein a first master shape is a square in canonical space and a second master shape is a triangle in canonical space.

20. Apparatus according to claim 11, further including interface means, wherein said image data is rendered from a view determined in response to virtual studio data.

21. In a virtual set, in which real foreground images are combined with synthesised background images in real-time, means configured to generate said background image data, including processing means and storage means for storing instructions for said processing means and for storing data representing a scene, wherein
said scene includes object elements in world space;
said object elements each have a surface that may be subdivided into a mesh; and
a plurality of said objects have a surface that is created in response to data from a master shape in canonical space, such that said instructions are configurable to control said processing means to perform the steps of;
creating said surface by an affine transformation of said master shape, wherein said master shape has a known area;
calculating a corresponding area of said surface with reference to the adjoint matrix of said affine transformation; and
using said surface area in world space to determine light emission characteristics for said scene.

22. Apparatus according to claim 21, wherein said processing means is configurable to apply said affine transformation to mesh elements in said master shape to generate mesh elements in world space, such that said adjoint matrix of said affine transformation is determined once for a selected surface and applied a plurality of times to determine the areas of mesh elements of said selected surface.

23. Apparatus according to claim 22, wherein said master shape is meshed hierarchically such that said surfaces derived from said master shape derive their respective mesh elements from said master shape.

24. Apparatus according to claim 21, wherein said master shape may be planar.

25. Apparatus according to claim 24, wherein said surface area may be calculated by a matrix-vector multiplication between said adjoint matrix and a normal to said master shape, thereby obtaining a magnitude; and multiplying this magnitude by the corresponding area in said master shape.

26. Apparatus according to claim 21, wherein said master shape may be non-planar, wherein said processing means is further configurable to perform the steps of:
calculating an area function with reference to a ration between a differential area of said surface in world space and a corresponding differential area in said master shape in canonical space, said differential area in world space being determined with reference to said adjoint matrix and a normal; and
calculating a numerical quadrature integration with reference to said area function in order to determine the area of said surface in world space.

27. Apparatus according to claim 21, wherein an area of said surface in world space may be determined by the product of a corresponding area in said master shape in canonical space; and
the magnitude of the matrix-vector multiplication between said adjoint matrix and a normal vector to said area of said master shape; wherein
said normal vector has unit magnitude.

28. Apparatus according to claim 21, wherein said processing means is further configurable to select a method of area calculation in response to the condition of planarity or non-planarity of the master shape.

29. Apparatus according to claim 21, wherein a first master shape is a square in canonical space and a second master shape is a triangle in canonical space.

30. Apparatus according to claim 21, wherein said virtual set includes display means allowing talent working within said set to view in real-time the interaction between real and synthesised imagery.

31. A computer-readable medium having computer-readable instructions executable by a computer such that said computer generates image data from scene data, in which said scene data includes object elements in world space; wherein
said object elements each have a surface that may be subdivided into a mesh;
a plurality of said objects have a surface that is created in response to data from a master shape in canonical space; such that
said surface is created by an affine transformation of said master shape;
said master shape has a known area;
a corresponding area of said surface is calculated with reference to the adjoint matrix of said affine transformation; and
said surface areas in world space are used to determine light emission characteristics for said scene.

32. A computer-readable medium according to claim 31, wherein said instructions are executed by said computer; wherein
said affine transformation is applied to mesh elements in said master shape to generate mesh elements in world space; wherein said adjoint matrix of said affine transformation is determined once for a selected surface; and said adjoint matrix is applied a plurality of times to determine the areas of mesh elements of said selected surface.

33. A computer-readable medium according to claim 32, wherein said instructions are executable by said computer; such that said master shape is meshed hierarchically such that said surfaces derived from said master shape derive their respective mesh elements from their master shape.

34. A computer-readable medium according to claim 31, wherein said instructions are executed by said computer with respect to a planar master shape.

35. A computer-readable medium according to claim 34, wherein said instructions are executed by said computer; such that said surface area is calculated by a matrix-vector multiplication between said adjoint matrix and a normal vector to said master shape;

a magnitude is obtained; and said magnitude is multiplied by the corresponding area of said master shape.

36. A computer-readable medium according to claim 31, wherein said instructions are executed by said computer, such that said master shape is non-planar; and an area function is determined with reference to a ration between a differential area of said surface in world space and a corresponding differential area of said master shape in said canonical space, said differential area in world space being determined with reference to said adjoint matrix and a normal vector; and a numerical quadrature integration is performed with reference to said area function in order to determine the area of said surface in world space.

37. A computer-readable medium according to claim 31, wherein said instructions are executed by said computer; such that an area of said surface in world space is determined by the product of a corresponding of said master shape in canonical space; and the magnitude of the matrix-vector multiplication between said adjoint matrix and a normal vector to said area of said master shape; wherein said normal has unit magnitude.

38. A computer readable medium according to claim 31, wherein said instructions are executed by said computer; such that a method of area calculation is selected in response to the condition of planarity or non-planarity of the master shape.

39. A computer-readable medium according to claim 31, wherein said instructions are executed by said computer; such that a first master shape is a square in canonical space and a second master shape is a triangle in canonical space.

40. A computer-readable medium according to claim 31, wherein said instructions are executed by computer; such that said image data is rendered from a view determined in response to real camera positional data within a virtual set.

* * * * *

UNITED STATES PATENT AND TRADEMARK OFFICE
CERTIFICATE OF CORRECTION

PATENT NO. : 6,262,742 B1
DATED : July 17, 2001
INVENTOR(S) : Filippo Tampieri

It is certified that error appears in the above-identified patent and that said Letters Patent is hereby corrected as shown below:

Column 17,
Line 53, strike "and"
Line 55, "." should read -- ; --
Line 56, insert -- and said scene is generated and displayed. --

Column 18,
Line 35, after "reponse", insert -- to --
Line 36, strike "to"
Line 54, strike "and"
Line 56, "." should read -- : --,
Line 57, insert -- and said scene is generated and displayed. --

Column 19,
Line 58, strike "and"
Line 60, "." should read -- : --,
Line 61, insert -- and said scene is generated and displayed. --

Column 20,
Line 59, strike "and"
Line 61, "." should read -- : --,
Line 62, insert -- and said scene is generated and displayed. --

Signed and Sealed this

Twenty-fifth Day of May, 2004

JON W. DUDAS
*Acting Director of the United States Patent and Trademark Office*